United States Patent

[11] 3,594,019

[72] Inventors Ralph W. Gotschall;
  Lawrence J. McDonough, both of Three Rivers, Mich.
[21] Appl. No 843,652
[22] Filed July 22, 1969
[45] Patented July 20, 1971
[73] Assignee The Johnson Corporation
  Three Rivers, Mich.

[54] ROTARY JOINT
  1 Claim, 2 Drawing Figs.
[52] U.S. Cl. .................................... 285/14, 285/190
[51] Int. Cl. .................................... F16l 55/00
[50] Field of Search ......................... 285/134, 190, 13, 14, 266

[56] References Cited
  UNITED STATES PATENTS
  2,377,196  5/1945  Walley ................ 285/14 X
  2,477,762  8/1949  Monroe ............... 285/266
  2,511,495  6/1950  Crot .................. 285/14 X
  FOREIGN PATENTS
  953,675   12/1956  Germany ............. 285/134
  665,107    6/1964  Italy ................. 285/14

*Primary Examiner*—Dave W. Arola
*Attorney*—Beaman & Beaman

ABSTRACT: A rotary joint having a nipple with a closed end and a vented head.

PATENTED JUL 20 1971

3,594,019

INVENTORS
LAWRENCE J. McDONOUGH
RALPH W. GOTSCHALL
BY
Beaman & Beaman
ATTORNEYS

ROTARY JOINT

SUMMARY OF THE INVENTION

The invention relates to rotary joints of the type having a nipple which has axial communication with a rotated part into which a fluid is conducted by the nipple, the nipple being supported and driven by the rotated part. Axially spaced on and relatively adjustable on the nipple and rotating therewith as a unit are spaced thrust collars which have a running seal with sealing rings supported by the joint housing. Fluid under pressure directed into the joint housing flows through radial ports in the nipple disposed between the thrust collars. The end of the nipple remote from the rotated part is closed and constitutes a wall portion of a vented chamber defined in part by one of the sealing rings and its associated thrust collar.

DRAWINGS

DETAILED DESCRIPTION

Figure 1:
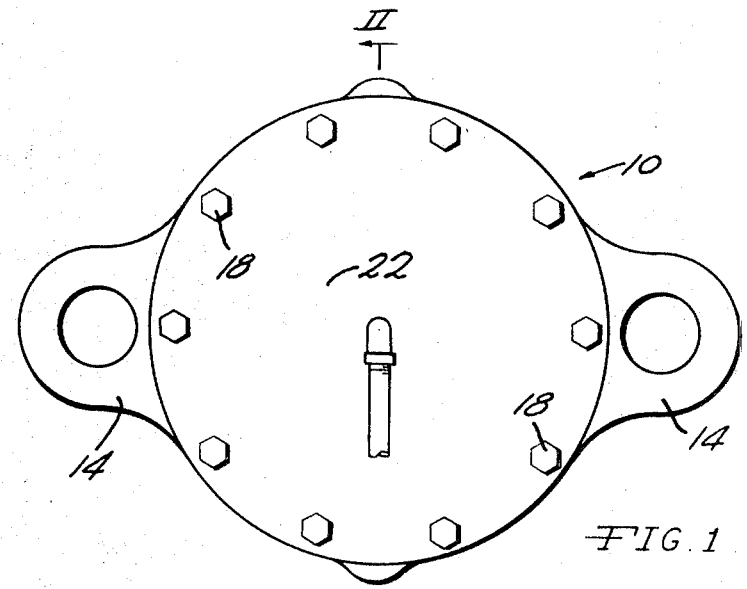
FIG. 1 is an end view of a rotary joint with the supporting rods removed.
Figure 2:
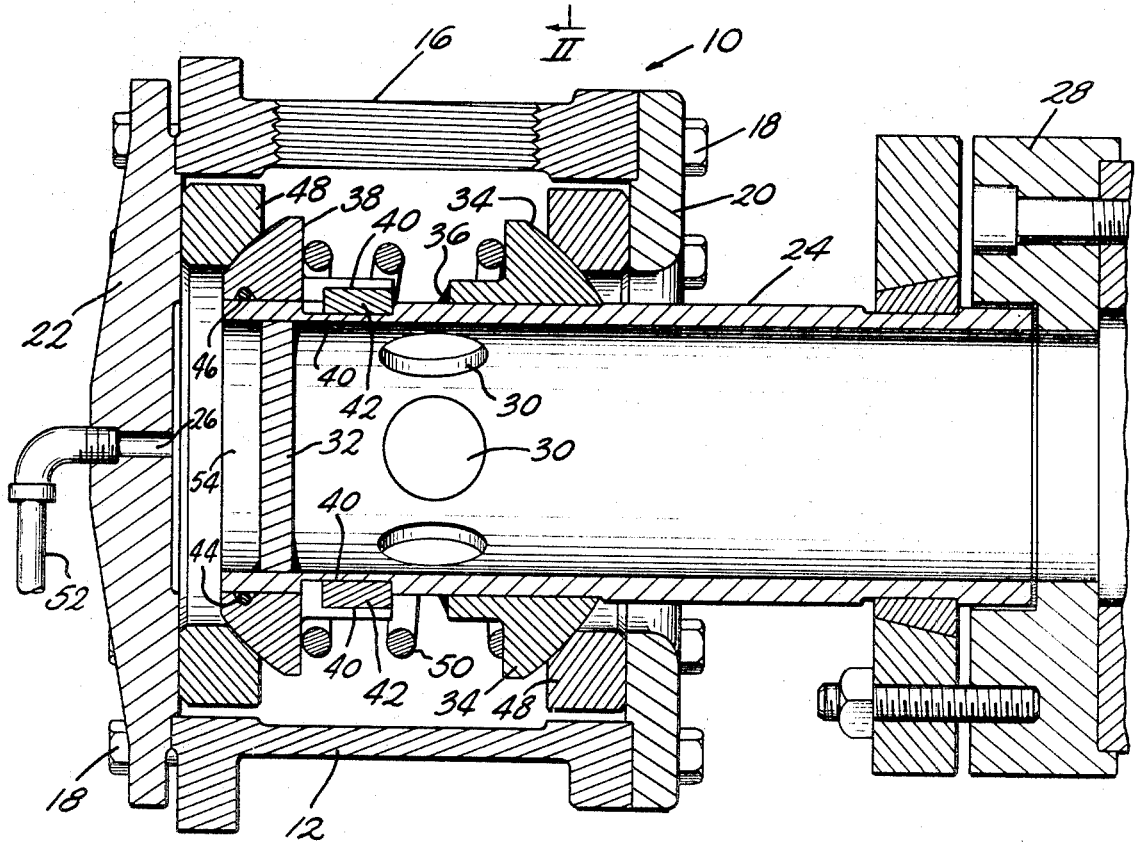
FIG. 2 is a vertical, cross-sectional view taken on line II-II of FIG. 1, the nipple being shown attached to a rotated part.

The rotary joint 10 comprises a central housing portion 12 of tubular form having integral apertured ears 14 to receive supporting rods in a well known manner. A fluid inlet is indicated at 16. Opposite ends of the portion 12 have attached thereto, by capscrews 18 or other suitable means, portions 20 and 22, the portion 20 being centrally apertured to provide clearance for the rotated nipple 24 and the portion 22 constituting the head of the joint 10 and closing the left end of the joint 10, as viewed in FIG. 2, except for the vent passage 26.

The nipple 24 is attached to and driven by the rotated part 28 in any suitable manner. As shown, the nipple 24 has radial fluid ports 30 and a wall 32 closing the end of the nipple 24 remote from the part 28. Thrust collar 34 is shown welded at 36 to the nipple 24, while the thrust collar 38 is axially slidable on the nipple 24. To cause the collar 38 to rotate with the nipple 24, alignable keyways 40 are provided in the nipple 24 and collar 38 and keys 42 receive therein. To seal the collar 38 on the nipple 24 yet provide for relative axial movement, a groove 44 is provided in the bore of the collar 38 to receive a suitable sealing O-ring 46.

Carbon graphite rings 48, each having a vertical sealing surface engaging with an interior surface of the portions 20 and 22 as well as having conical sealing surfaces engaging with the conical surfaces of thrust collars 34 and 38, are provided and function in a well known manner. The cylindrical compression spring 50 is disposed between the collars 34 and 38 and tends to move the joint 10 to the left on the nipple 24, as viewed in FIG. 2, to compensate for the wear on the sealing rings 48. A vent pipe 52 is connected to the vent passage 26.

OPERATION

Fluid under pressure, such as steam, enters the joint 10 through inlet 16 and flows through ports 30 of the nipple 24 and then axially of the nipple 24 into the interior of the rotated part 28.

The thrust collar 38 is freely slidable on the nipple 24 with the sealing O-ring 46 acting to prevent leakage between the bore of the collar 38 and the exterior surface of the nipple 24 upon which the collar 38 is supported for free sliding movement. Should any leakage occur past the O-ring 46 or between the sealing ring 48 and the surfaces of the head 22 and collar 38 with which the seal ring 48 engages, the vent passage 26 will prevent any pressure building up in the chamber 54 which is defined between the wall 32 of the nipple 24 and the head 22.

With the end of the nipple 24, remote from the rotated part 28, closed and the chamber 54 vented to the atmosphere, the joint 10 is fairly well balanced on the nipple 24 with a resulting reduction in frictional load, the amount of unbalanced state being a factor of the load of the spring 50 and the fluid pressure acting upon an annulus defined between the outer diameter of the nipple 24 and the sealing diameter of the sealing ring 48.

We claim:

1. In a rotary joint of the type having a nipple adapted to be attached to and driven by a rotated part, axially spaced thrust collars on said nipple, a fixed housing embracing the end of said nipple remote from the rotated part, a fluid inlet in said housing for admitting fluid under pressure, a radial port defined by said nipple and located between said collars for conducting fluid pressure from said housing to the interior of said nipple, sealing rings disposed between said collars and said housing to seal fluid pressure flowing between said inlet and said port, the improvement comprising a wall having an interior side and an exterior side closing one end of said nipple, said wall being disposed to the side of said port remote from the end of said nipple attached to the rotated part, said interior side of said wall being exposed to the fluid pressure within said nipple, a chamber defined between said housing and said exterior side of said wall, means for venting said chamber into a zone of lower fluid pressure than the operating fluid pressure within said nipple, one of said thrust collars having a cylindrical bore, the closed end of said nipple being cylindrical and received in said bore for relative movement, means providing a seal between said bore and said cylindrical closed end, one end of said bore opening into said vented chamber.